United States Patent [19]
Miyata et al.

[11] Patent Number: 5,313,849
[45] Date of Patent: May 24, 1994

[54] DEVICE FOR TEMPORARILY HOLDING PRESSURE SENSOR IN PLACE WITHIN SPARK PLUG ATTACHING HOLE OF CYLINDER HEAD

[75] Inventors: Shigeru Miyata; Yoshiaki Matsubara; Takao Kojima, all of Aichi, Japan

[73] Assignee: NGK Spark Plug Co., Ltd., Nagoya, Japan

[21] Appl. No.: 870,473

[22] Filed: Apr. 17, 1992

[30] Foreign Application Priority Data

Apr. 25, 1991 [JP] Japan .................................. 3-125208
Apr. 26, 1991 [JP] Japan .................................. 3-038832

[51] Int. Cl.⁵ ...................... G01D 21/00; G01L 7/00; G01L 9/00
[52] U.S. Cl. ...................... 73/866.5; 73/754; 73/714
[58] Field of Search ............. 73/866.5, 756, 754, 73/753, 714, 115, 35, 861, DIG. 4; 310/338

[56] References Cited

U.S. PATENT DOCUMENTS

| | | |
|---|---|---|
| 4,602,506 | 7/1986 | Sawamoto et al. |
| 4,686,861 | 8/1987 | Morii ........................ 73/754 |
| 4,898,024 | 2/1990 | Takeuchi . |
| 4,909,071 | 3/1990 | Amano et al. ............. 73/754 |
| 4,996,873 | 3/1991 | Takeuchi . |
| 5,101,659 | 4/1992 | Takeuchi ................... 73/115 |

FOREIGN PATENT DOCUMENTS 62-65529 4/1987 Japan .

Primary Examiner—Hezron E. Williams
Assistant Examiner—Daniel S. Larkin
Attorney, Agent, or Firm—Foley & Lardner

[57] ABSTRACT

A retaining ring is provided for temporarily holding a pressure sensor in place within a spark plug attaching hole prior to installation of a spark plug. The retaining ring is resiliently deformed into a stressed positioned to attach itself to a circumferential wall of the spark plug attaching hole. In one embodiment, a gasket is adapted to serve also as such a retaining ring.

32 Claims, 12 Drawing Sheets

DEVICE FOR TEMPORARILY HOLDING PRESSURE SENSOR IN PLACE WITHIN SPARK PLUG ATTACHING HOLE OF CYLINDER HEAD

BACKGROUND OF THE INVENTION

1. Field of the Invention

The present invention relates in general to installation of a pressure sensor and spark plug on a cylinder head of an internal combustion engine and more particularly to a device for temporarily holding a pressure sensor in place within a spark plug attaching hole of a cylinder head prior to installation of a spark plug.

2. Description of the Prior Art

In some automotive engine, a ring-shaped pressure sensor is installed between a spark plug and a cylinder head for measuring a pressure within an engine cylinder and thereby detecting a combustion condition of the engine as disclosed in Japanese Utility Model Provisional Publication No. 62-65529. The pressure sensor includes a piezoelectric ceramic element for converting a cylinder pressure into an electric signal and a lead wire for taking out the electric signal to the outside.

In installation, the pressure sensor is placed in the spark plug attaching hole together with a gasket and firmly held between the spark plug and the cylinder head when the spark plug is screwed into a threaded section of the spark plug attaching hole and tightened by means of a tool such as an impact wrench.

A disadvantage of the prior art installation of the pressure sensor is that the pressure sensor is movable in the spark plug attaching hole prior to installation of the spark plug. Due to this, the pressure sensor is liable to be positioned out of place prior to installation of the spark plug or in the case of the spark plug attaching hole being shallow, there is a possibility that the gasket is dropped off from the spark plug attaching hole prior to installation of the spark plug.

Further, in the case where the pressure sensor is positioned out of place to cause its lead wire, which is soft and easily deformable, to be positioned outside the lead wire receiving groove, such a lead wire may become an obstacle to installation of the spark plug.

For the above disadvantages, it has been difficult to attain automatic installation of the pressure sensor, gasket and spark plug on the cylinder head.

SUMMARY OF THE INVENTION

In accordance with the present invention, there is provided a device for temporarily holding a pressure sensor in place within a spark plug attaching hole of a cylinder head prior to installation of a spark plug.

The device comprises an annular body installed in the spark plug attaching hole and engageable with the pressure sensor for restraining movement of the pressure sensor within the spark plug attaching hole, and resilient means connected to the annular body and resiliently deformed to attach itself to a circumferential wall of the spark plug attaching hole for thereby supporting the annular body on the circumferential wall of the spark plug attaching hole.

The above structure is effective for overcoming the above noted disadvantages inherent in the prior art device.

It is accordingly an object of the present invention to provide a device for temporarily holding a pressure sensor in place within a spark plug attaching hole prior to installation of a spark plug, which is simple in structure, economical and reliable in operation.

It is a further object of the present invention to provide a device of the above described character which enables an easy and assured installation of the spark plug and gasket as well as the pressure sensor.

It is a further object of the present invention to provide a pressure sensor arrangement which can assuredly hold a pressure sensor in place within a spark plug attaching hole prior to installation of a spark plug.

DESCRIPTION OF THE PREFERRED EMBODIMENNTS

Figure 1:
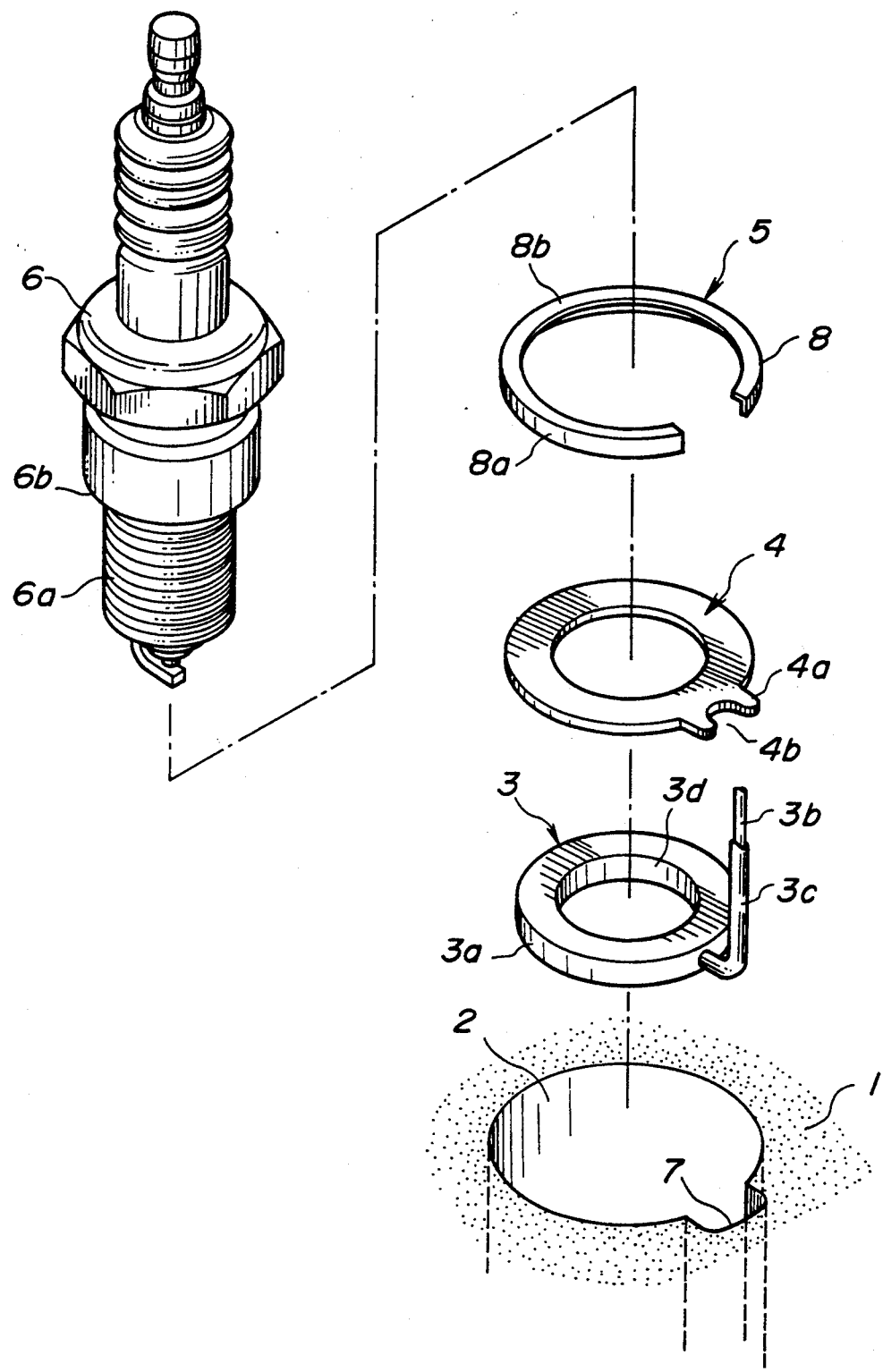
FIG. 1 is an exploded view of a device for temporarily holding a pressure sensor in place within a spark plug attaching hole according to an embodiment of the present invention.
Figure 2:
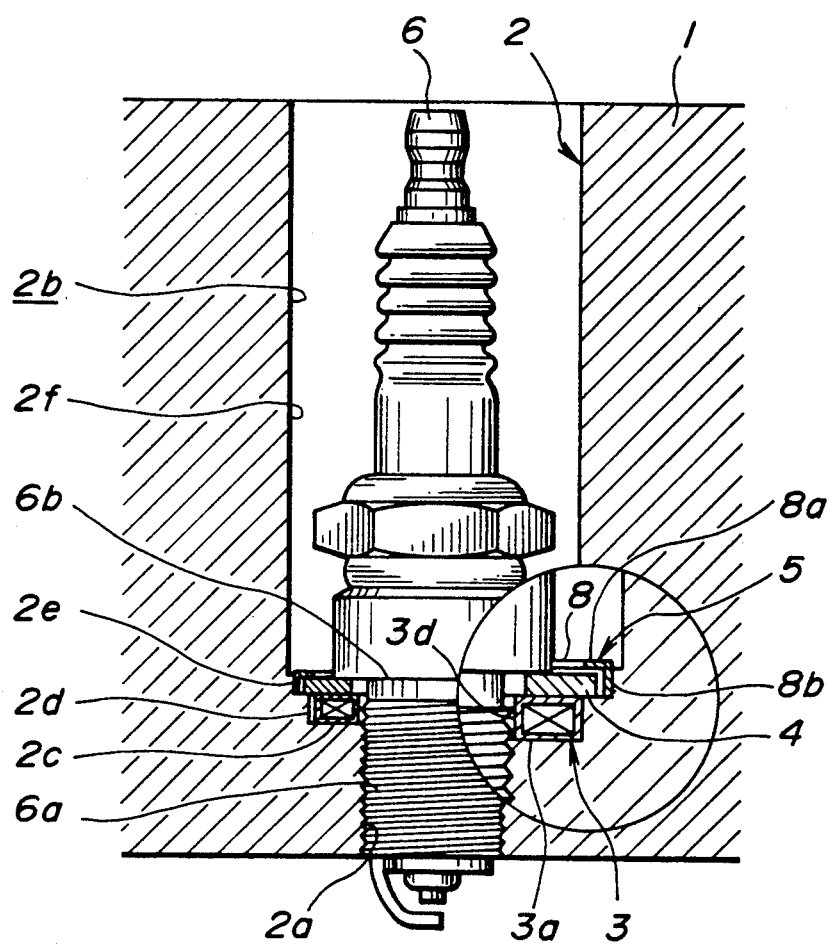
FIG. 2 is a sectional, partly enlarged view of the device of FIG. 1 after installation of the spark plug.

Referring first to FIGS. 1 and 2, a cylinder head 1 has a spark plug attaching hole 2 in which a pressure sensor 3, gasket 4, stopper or retaining ring 5 and a spark plug 6 are installed one after another.

The spark plug attaching hole 2 has a lower threaded hole section 2a into which a threaded section 6a of the spark plug 6 is screwed and an upper hole section 2b for surrounding a part of the spark plug 6 protruding upwardly or outwardly from the threaded hole section 2a. The spark plug attaching hole 2 has an annular shoulder or bottom 2c at the junction between the upper and lower hole sections 2b and 2a. The pressure sensor 3 is placed on the bottom 2c and directly in contact with same when held in place.

The pressure sensor 3 is the conventional type and consists of a ring-shaped sensor body 3a having a built-in piezoelectric ceramic element, a lead wire 3b and a lead wire protecting tube 3c brazed at an end to the sensor body 3a and receiving therein a lower part of the lead wire 3b. The sensor body 3a has a central opening 3d for allowing the threaded section 6a of the spark plug 6 to pass therethrough. The spark plug attaching hole 2 is radially recessed to form a lead wire receiving groove 7 extending axially thereof for receiving therein the lead wire 3b and the lead wire protecting tube 3c of the pressure sensor 3.

The gasket 4, which is placed on the sensor body 3a, is a flat ring made of copper and having at the outer periphery thereof a radially outwardly protruding finger 4a to be fitted in or engaged with the lead wire receiving groove 7 for thereby preventing rotation of the gasket 4 relative to the spark plug attaching hole 2. The finger 4a is formed with a recess 4b for allowing the lead wire 3b and its protecting tube 3c to pass therethrough or extend upward therethrough.

The retaining ring 5, which is placed above the gasket 4, is a part-circular or C-like ring made of metal and resiliently deformable to fit in the spark plug attaching hole 2 such that the retaining ring 5, when deformed into a stressed position, is capable of attaching itself to the circumferential wall of the spark plug attaching hole 2. More specifically, the retaining ring 5 consists of a body 8 of an L-like cross section, including a part-cylindrical side wall 8a and an outer or upper end wall 8b. As seen from FIG. 2, the side wall 8a is of such a height as to provide a clearance or gap between the gasket 4 and the upper end wall 8b such that the gasket 4 is not pushed down by the retaining ring 5 when the retaining ring 5 is pushed into its innermost position within the spark plug attaching hole 2. On the other hand, the upper end wall 8b of the retaining ring 5 is sized to define an opening of such a diameter that is larger than the outer diameter of a seat portion 6b of the spark plug 6 such that the seat portion 6b is not brought into contact with the upper end wall 8b when the spark plug 6 is tightened. Further, upward movement of the gasket 4 and sensor body 3a prior to installation of the spark plug 6 is restrained by the retaining ring 5 since the gasket 4 is brought into contact at its outer peripheral portion with the upper end wall 8b of the body 8 when moved a little upward and cannot move further upward.

In the meantime, the retaining ring 5 may be constructed and arranged so as to directly contact the sensor body 3a to hold it in place. In such a case, the gasket 4 can previously be installed on the spark plug 6 to be handled together therewith.

The outer diameter of the body 8 of the retaining ring 5 is designed to be a little larger than the inner diameter of the spark plug attaching hole 2 such that the retaining ring 5 fits in the spark plug attaching hole 2 a little tightly. In this embodiment, the upper hole section 2b of the spark plug attaching hole 2 is formed into such a stepped hole section including a lower portion 2d next to the threaded section 2a, intermediate portion 2e and upper portion 2f. The retaining ring 5 is adapted to fit in the intermediate portion 2e to hold the gasket 4 in the intermediate portion 2e and the sensor body 3a in the lower portion 2d. To this end, the outer diameter of the body 8 of the retaining ring 5 is designed to be a little larger than the diameter of the intermediate portion 2e.

Figure 3:
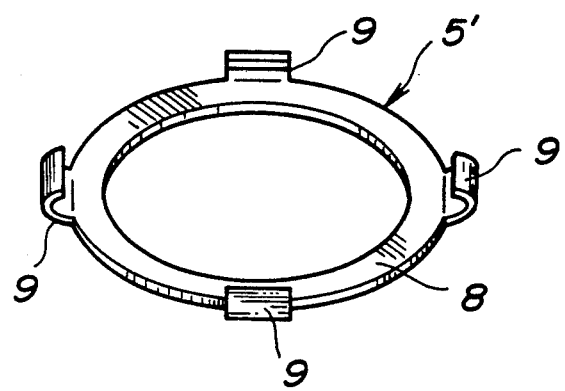
FIG. 3 is a perspective view of a modified form of retaining ring employed in the device of FIG. 1.

FIG. 3 shows a modified form of the retaining ring 5'. In this modification, the body 8 is in the form of a flat ring and has at the outer periphery thereof a plurality of resilient radially outward projections 9 of a semi-circular cross section such that the projections 9 are resiliently deformable to attach themselves to the circumferential wall of the spark plug attaching hole 2 for thereby holding the retaining ring 5' in a desired position within the spark plug attaching hole 2. Preferably, the projections 9 are bent radially inwardly of the retaining ring 5' and into an arcuated shape such that a tool may be engaged with the projections 9 in the case of removal of the gasket 4 and pressure sensor 3 from the spark plug attaching hole 2.

Figure 4:
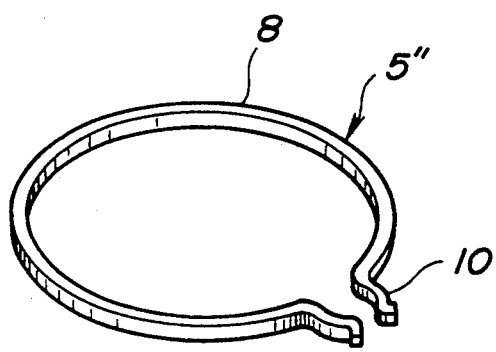
FIG. 4 is a perspective view of a further modified form of retaining ring employed in the device of FIG. 1.

FIG. 4 shows another modified form of the retaining ring 5". In this modification, the body 8 of the retaining ring 5" is formed into a spring of a C-like shape and its split ends 10 are bent radially outward and each into an arcuated shape such that the split ends 10 are fittingly engageable with the lead wire receiving groove 7. In this instance, by grasping the split ends 10 by means of a tool and thereby causing the body 8 to reduce in diameter, removal of the retaining ring 5" out of the spark plug attaching hole 2 can be attained with ease.

Figure 5:
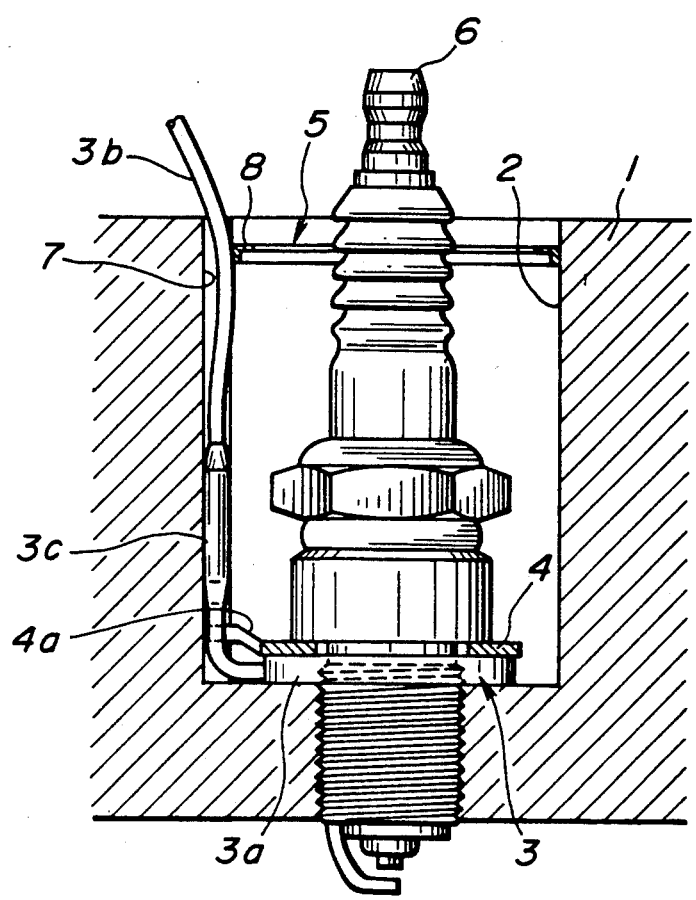
FIG. 5 is a sectional view of a further embodiment of the present invention.

The retaining ring 5, 5' or 5" structured as above can be used for holding the lead wire 3b of the pressure sensor 3 in place as shown in FIG. 5. For example, under the condition of the lead wire 3b being received in the groove 7, the stopper ring 5 is fitted in the spark plug attaching hole 2 at a position adjacent the upper or outer end thereof to allow the body 8 to partially close the groove 7. By this, the lead wire 3b is assuredly prevented from being positioned outside the groove 7 such that installation of the spark plug 6 can be accomplished with ease. The retaining ring 5 may be removed from the spark plug attaching hole 2 after installation of the spark plug 6.

While in the embodiments shown in FIGS. 1–2 and 5 one retaining ring 5 has been described and shown as being used for one spark plug attaching hole 2 for holding either of the sensor body 3a or the lead wire 3b in place within the spark plug attaching hole 2, this is not for the purpose of limitation but more than two of retaining rings 5 may be used for one spark plug attaching hole 2 such that the upper one is used for holding the lead wire 3b in place while the lower one is used for holding the sensor body 3a in place. In this manner, by the use of more than two retaining rings 5, the pressure sensor 3 can be held in place more assuredly. For example, in the case of the intermediate portion of the lead wire 3b being loose, another retaining ring 5 may be used for holding the intermediate portion of the lead wire 3b within the groove 7.

Figure 6:
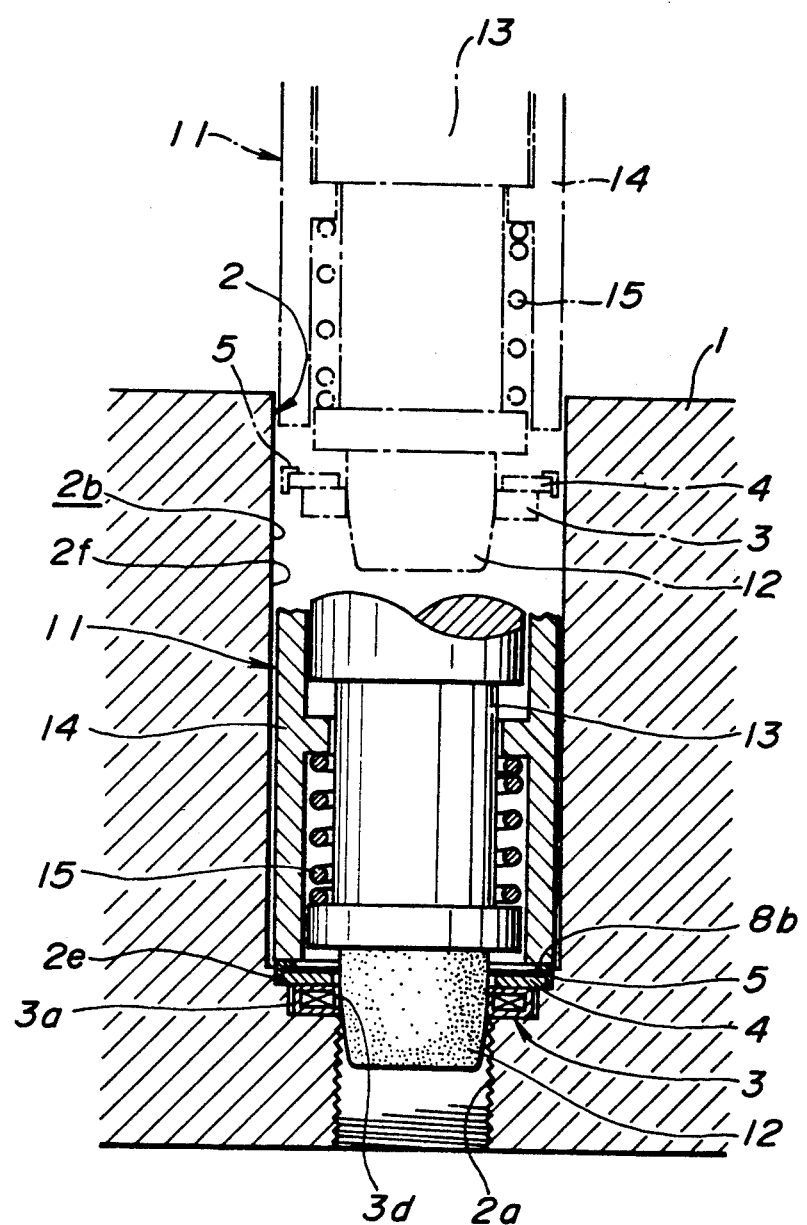
FIG. 6 is a sectional view of the device of FIG. 1 together with a jig used for installation of the pressure sensor, gasket and retaining ring in place within the spark plug attaching hole.

The pressure sensor 3, gasket 4 and retaining ring 5 can be installed all together in the spark plug attaching hole 2 by using a jig 11 shown in FIG. 6 as follows.

The jig 11 includes a guide post 13 having at a lower end a resilient guide head 12 and an outer sleeve 14 slidably installed on the guide post 13.

The guide head 12 is slightly tapered at a lower end portion and capable of fitting at an upper end portion into the central opening 3d of the sensor body 3a to frictionally hold the sensor body 3a thereon.

The outer diameter of the sleeve 14 is slightly smaller than the diameter of the upper portion 2f of the stepped hole section 2b of the spark plug attaching hole 2 such that the outer sleeve 14 is insertable into the upper portion 2f. A spring 15 is interposed between the guide post 13 and the outer sleeve 14 for urging the sleeve 14 always upward. The thickness of the circumferential wall of the sleeve 14 is designed to be larger than the thickness of the upper end wall 8b in the radial direction thereof such that the lower end of the outer sleeve 14 can be assuredly brought into contact with the upper end wall 8b of the retaining ring 5 when the jig 11 is moved downward within the spark plug attaching hole 2.

The guide post 13 and outer sleeve 14 are constructed so as to be movable relative to each other and attached to a hydraulic cylinder or the like.

In the first step of installation, the retaining ring 5, gasket 4, sensor body 3a are installed in this order on the guide head 12. This work can be accomplished by first stacking the sensor body 3a, gasket 4 and retaining ring 5 and then inserting the guide head 12 of the jig 11 into the central opening 3d of the sensor body 3a. By this, the guide head 12 is inserted into the opening 3d of the sensor body 3a to frictional hold thereon the sensor body 3a while supporting the gasket 4 and retaining ring 5 between the guide head 12 and the sensor body 3a. At this time, the outer sleeve 14 is located in its upper position as shown by the chain line in FIG. 6 and therefore held apart from the retaining ring 5.

Then, the jig 11 is inserted into the spark plug attaching hole 2 to arrange the sensor body 3a of the sensor 3, gasket 4 and retaining ring 5 in place within the spark plug attaching hole 2. The retaining ring 5 is thus fitted in the middle portion 2e of the spark plug attaching hole 2 to hold the sensor body 3a in the lower portion 2d and the gasket 4 in the middle portion 2e. In the meantime, since the retaining ring 5 is designed to be a little larger in diameter than the intermediate portion 2e of the spark plug attaching hole 2, it is forcedly inserted into the intermediate portion 2e when the outer sleeve 14 is moved downward relative to the guide post 13 as shown by the solid line in FIG. 6.

Then, the jig 11 is moved upward for removal from the spark plug attaching hole 2. In this instance, the guide post 13 is first moved upward while allowing the outer sleeve 14 to keep pushing the retaining ring 5 downward such that the retaining ring 5 is removed from the guide head 12. Thereafter, the outer sleeve 14 is moved upward together with the guide post 13. In this manner, the sensor body 3a and gasket 4 are held in place within the spark plug attaching hole 2 by means of the retaining ring 5.

Finally, the spark plug 6 is installed in the spark plug attaching hole 2 by making the spark plug 6 screwed at its threaded section 6a into the threaded section 2a of the spark plug attaching hole 2 and tightened by means of a tool such as an impact wrench. By this, the sensor body 3a and the gasket 4 are held tightly between the spark plug 6 and the cylinder head 1.

Figure 7:
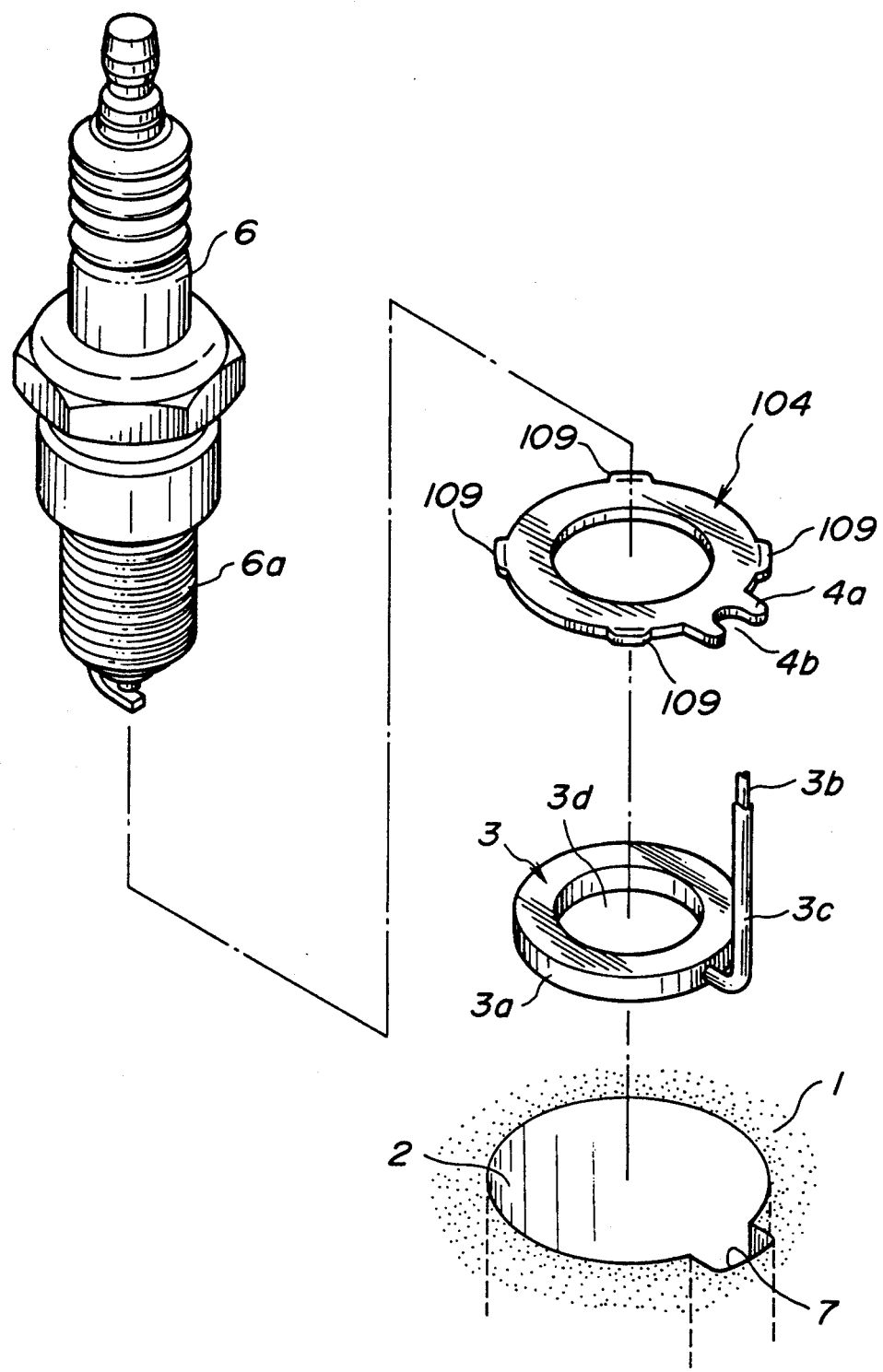
FIG. 7 is a view similar to FIG. 1 showing a further embodiment of the present invention.
Figure 8:
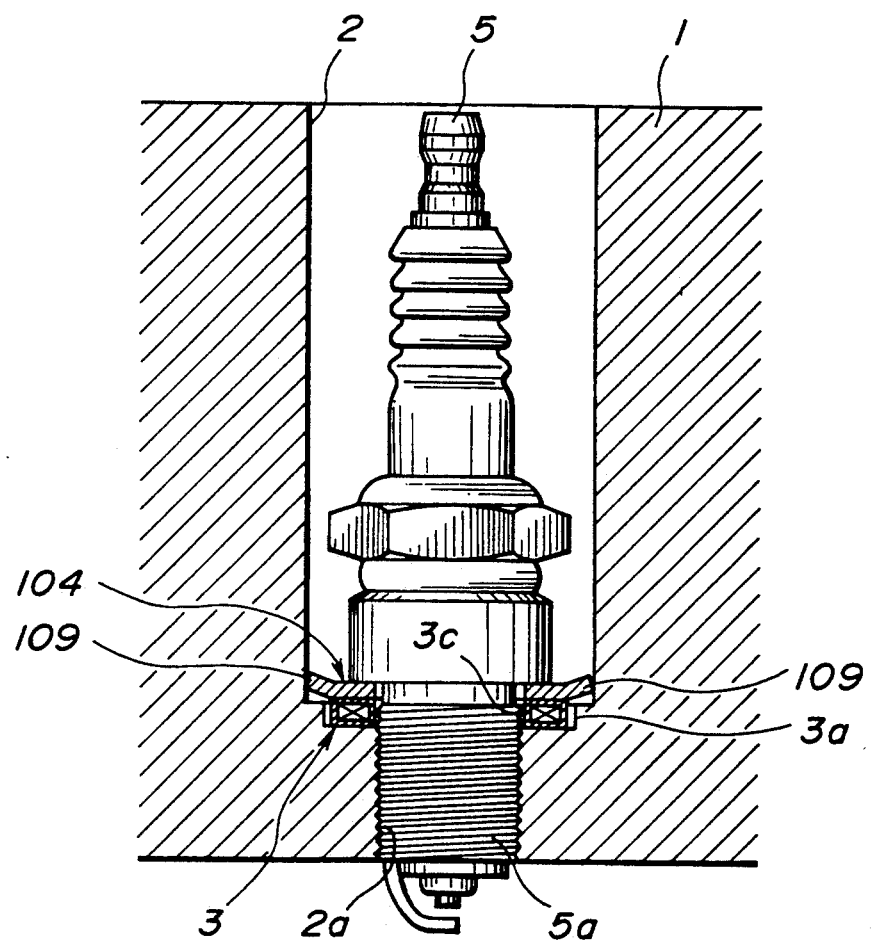
FIG. 8 is a sectional view of the device of FIG. 7 after installation of the spark plug.

FIGS. 7 and 8 show a further embodiment of the present invention. This embodiment differs from the previous embodiment of FIGS. 1 and 2 in that the gasket 104 is constructed so as to be capable of attaching itself to the circumferential wall of the spark plug attaching hole 2 to dispense with the retaining ring. More specifically, the gasket 104 has on the outer periphery thereof a plurality of radially outward projections 109 resiliently deformable to attach themselves to the circumferential wall of the spark plug attaching hole 2. Such projections 109 may be formed by the apex portions of the gasket having an outer periphery formed into a polygonal shape such as a rectangular or hexagonal shape.

Except for the above, this embodiment is substantially similar to the previous embodiment of FIGS. 1 and 2 and can produce the same effect.

The gasket 104 of FIGS. 7 and 8 may be modified variously as shown in FIGS. 9 to 13.

Figure 9:
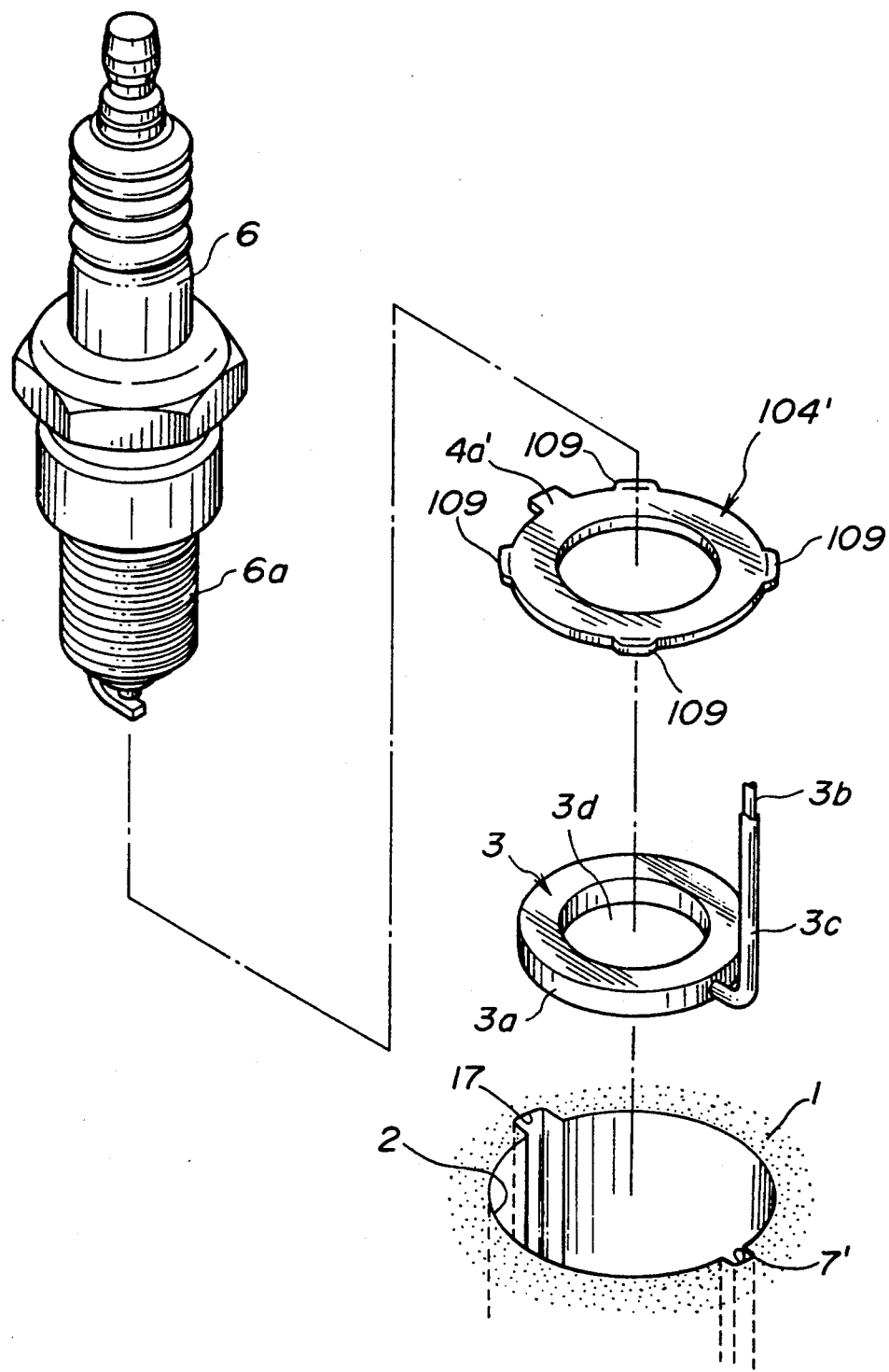
FIG. 9 is a view similar to FIG. 7 showing a modified form of gasket.

In the modified form of FIG. 9, the finger 4a' of the gasket 104' is not formed with a recess for allowing the lead wire 3b to extend therethrough but adapted for engagement with another groove 17 of the spark plug attaching hole 2 for preventing rotation of the gasket 104' relative to the spark plug attaching hole 2. The groove 7' which is diametrically opposed to the groove 17 is provided only for receiving therein the lead wire 3b. This embodiment is advantageous since it does not require a large-sized finger and groove, i.e., the finger 4a' and the grooves 7' and 17 can be smaller in size as compared with those of the gasket 104 of FIGS. 7 and 8.

Figure 10:
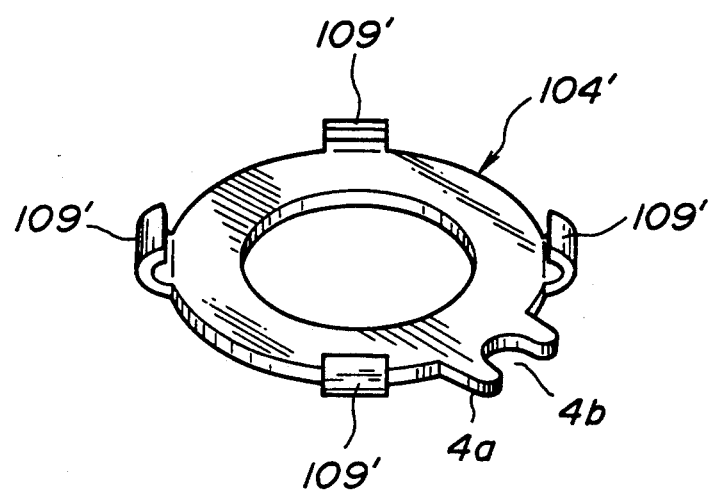
FIG. 10 is a perspective view of a modified form of gasket employed in the device of FIG. 7.

In the modified form of FIG. 10, the projections 109' have a C-like cross section and are bent inwardly of the gasket 109' such that a tool is engaged with the projections 109' in the case of removal of the gasket 104". By this, removal of the gasket 104" can be attained with ease.

Figure 11:
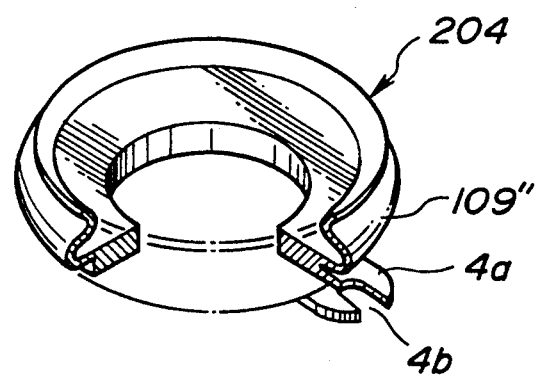
FIG. 11 is a perspective, partly sectioned view of a further modified form of gasket employed in the device of FIG. 7.

In the modified form of FIG. 11, a single projection 109" extends throughout the outer periphery of the gasket 204 and is formed into a tubular spring of a S-like cross section in such a manner as to have a radially outwardly bent upper free end and a radially inwardly bent lower end connected to the outer periphery of the gasket 204. The gasket 204 with such a projection 109" can be removed with ease by making diametrically opposed portions of the projection 109" come closer.

Figure 12:
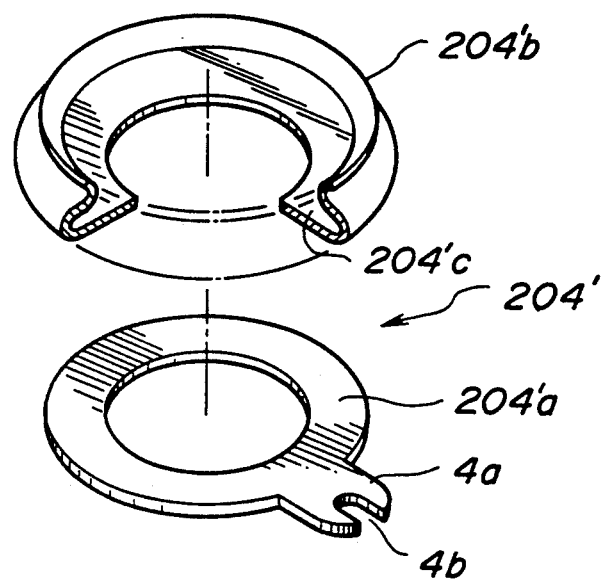
FIG. 12 is a perspective, partly sectioned view of a further modified form of gasket employed in the device of FIG. 7.

In the modified form of FIG. 12, the gasket 204' consists of two separate parts, i.e., a gasket part 204'a and a retaining ring part 204'b. The gasket part 204'a is substantially similar to the gasket 4 of the previous embodiment of FIGS. 1 and 2. The retaining ring part 204'b is substantially similar to the projection 109" of the previous embodiment of FIG. 10 except that it is additionally provided with a flat ring portion 204'c to be joined with the gasket part 204'a. With this structure, the retaining part 204'b can be formed from a low carbon steel of a high formability, and the gasket part 204'a can be formed from a copper plate so as to prevent uneven contact between the gasket 204' and the pressure sensor 3.

Figure 13:
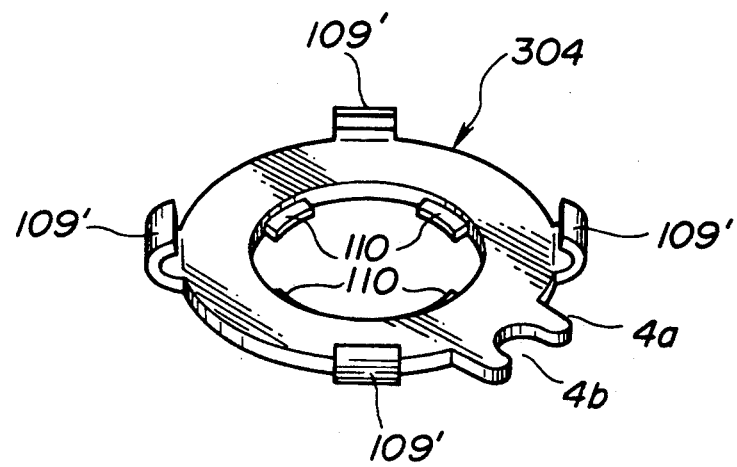
FIG. 13 is a view similar to FIG. 10 showing a further modified form of gasket employed in the device of FIG. 7.

In the modified form of FIG. 13, the gasket 304 is substantially similar to that of FIG. 10 except that it is further provided with a plurality of radially inward projections 110 at the inner periphery thereof. The projections 110 are engageable with the threaded section 6a of the spark plug 6 so as to releasably hold the gasket 304 on the spark plug 2 such that the gasket 304 can be installed in the spark plug attaching hole 2 together with the spark plug 6. Once the gasket 304 is installed in the spark plug attaching hole 2, it is removably attached to the circumferential wall of the spark plug attaching hole 2 such that the gasket 304 remains in place within the spark plug attaching hole 2 in the case of removal of the spark plug 6 for its maintenance, replacement, etc. Accordingly, next installation of the spark plug 6 can be attained with ease and assuredly.

Figure 14:
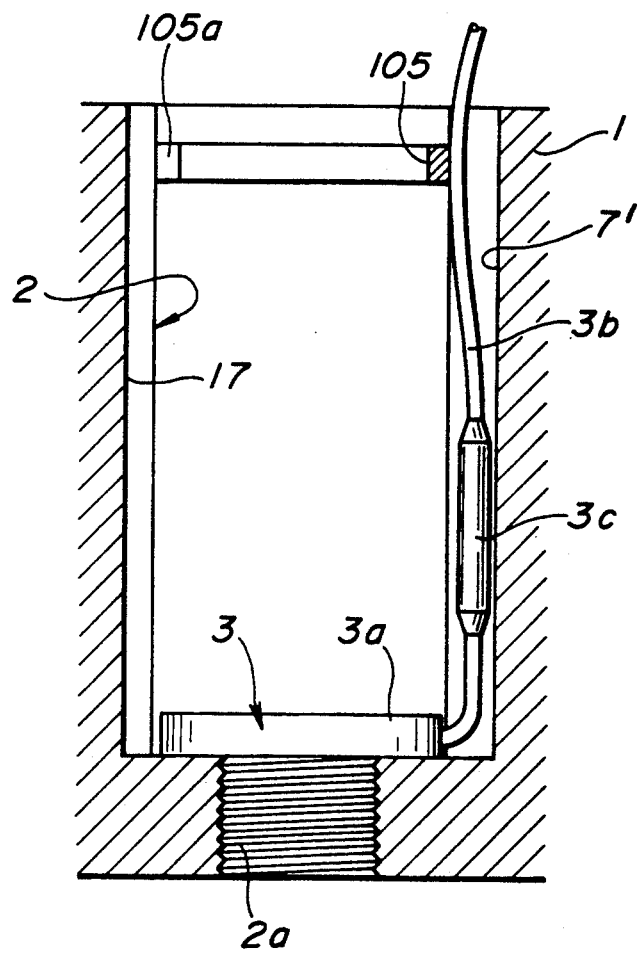
FIG. 14 is a sectional view of a further embodiment of the present invention.

FIG. 14 shows a further embodiment of the present invention. In this embodiment, a part-circular rubber ring 105 is removably attached to the circumferential wall of the spark plug attaching hole 2 to partially close the groove 7' at its outer peripheral portion and thereby hold the lead wire 3b within the groove 7' similarly to the embodiment of FIG. 5. Such a rubber ring 105 is effective for holding the pressure sensor 3 in place within the spark plug attaching hole 2 prior to installation of the spark plug 6.

Figure 15:
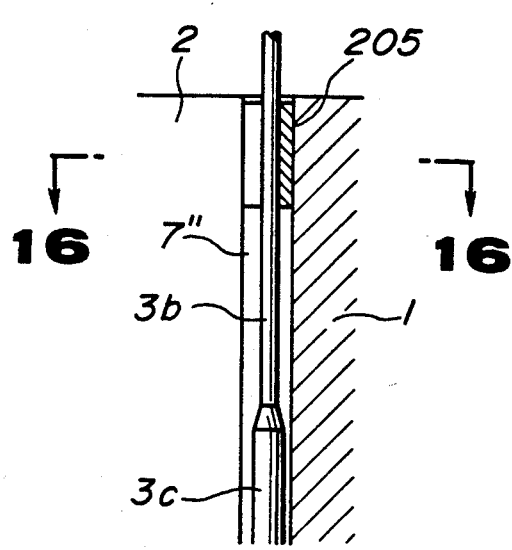
FIG. 15 is a fragmentary sectional view of a further embodiment of the present invention.
Figure 16:
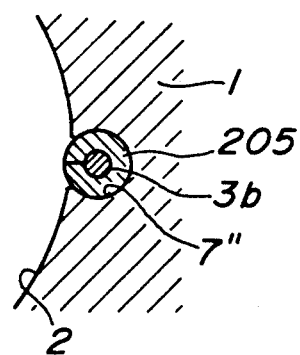
FIG. 16 is a sectional view taken along line 16—16 of FIG. 15.

As shown in FIGS. 15 and 16, a rubber tube 205 may be used in place of the rubber ring 105 of FIG. 14. The rubber tube 205 is circumferentially cut or split throughout the length and designed to fittingly receive therein the lead wire 3b and be resiliently deformed to fit in the groove 7" of a part-circular cross section.

In use of such a rubber ring 105 of FIG. 14 and a rubber tube 205 of FIGS. 15 and 16, the spark plug attaching hole 2 may be further radially recessed to form another groove 17 similarly to the embodiment of FIG. 9 such that the rubber ring 105 or rubber tube 205 may not become an obstacle to insertion of the gasket 104' into the spark plug attaching hole 2. To this end, the rubber ring 105 of FIG. 14 is arranged so as to define between the split ends 105a a space which is aligned with the groove 17 such that the gasket 104', when held vertically, can be inserted through the gasket 105 into the spark plug attaching hole 2.

What is claimed is:

1. A device for temporarily holding a pressure sensor in place within a spark plug attaching hole of a cylinder head prior to installation of a spark plug, comprising:
   an annular body installed in the spark plug attaching hole and engageable with the pressure sensor for restraining movement of the pressure sensor within the spark plug attaching hole; and
   resilient means connected to said annular body and resiliently deformed to attach itself to a circumferential wall of the spark plug attaching hole for thereby supporting said annular body on the circumferential wall of the spark plug attaching hole.

2. The device as set forth in claim 1, wherein said body and said resilient means comprise a resiliently deformable part-circular retaining ring resiliently deformed into a stressed position to fit in the spark plug attaching hole.

3. The device as set forth in claim 2, wherein said retaining ring is engageable with a ring-shaped body of said pressure sensor.

4. The device as set forth in claim 2, wherein the spark plug attaching hole is radially recessed to form a groove for receiving therein a lead wire of the pressure sensor, said retaining ring being engageable with the lead wire to hold it within the groove.

5. The device as set forth in claim 4, wherein said retaining ring is variable in position on the circumferential wall of the spark plug attaching hole.

6. The device as set forth in claim 5, wherein said retaining ring has split ends which are bent radially outward and arcuated so as to be fittingly engageable with the groove while holding therebetween the lead wire.

7. The device as set forth in claim 1, wherein said body is in the form of a flat ring, and said resilient means comprises a plurality of resiliently deformable radially outward projections at an outer periphery of said flat ring and integral with same.

8. The device as set forth in claim 7, wherein said projections have a c-like cross section and bent inwardly of said ring.

9. The device as set forth in claim 8, wherein said ring has a plurality of radially inward projections engageable with a threaded section of the spark plug for thereby holding said ring on the spark plug.

10. The device as set forth in claim 7, wherein the spark plug attaching hole is radially recessed to form a groove for receiving therein a lead wire of the pressure sensor, said ring having a finger engaged with the groove for preventing rotation of said ring relative to the spark plug attaching hole.

11. The device as set forth in claim 7, wherein the spark plug attaching hole is radially recessed to form first and second grooves, a lead wire of the pressure sensor being received in the first groove, said ring having a finger engaged with the second groove for preventing rotation of said ring relative to the spark plug attaching hole.

12. The device as set forth in claim 1, wherein said body is in the form of a flat ring, and said resilient means comprises a tubular spring of an S-like cross section.

13. The device as set forth in claim 12, wherein said tubular spring is integral with said flat ring.

14. The device as set forth in claim 12, wherein said tubular spring is independent from said flat ring.

15. The device as set forth in claim 14, wherein said ring is made of copper, and said spring is made of steel.

16. The device as set forth in claim 12, wherein the spark plug attaching hole is radially recessed to form a groove for receiving therein a lead wire of the pressure sensor, said ring having a finger engaged with the groove for preventing rotation of said ring relative to the spark plug attaching hole.

17. A device for temporarily holding a pressure sensor in place within a spark plug attaching hole of a cylinder head prior to installation of a spark plug, the spark plug attaching hole being radially recessed to form an axial groove for receiving therein a lead wire of the pressure sensor, the device comprising:
   a gasket in the form of a flat ring, placed on the pressure sensor installed in place within the spark plug attaching hole and having a finger engaged with the groove for preventing rotation of said gasket relative to the spark plug attaching hole; and
   a resiliently deformable retaining ring resiliently deformed to attach itself to a circumferential wall of the spark plug attaching hole at a position above said gasket such that movement of said pressure sensor and said gasket within the spark plug attaching hole is restrained by said retaining ring.

18. The device as set forth in claim 17, wherein said finger of said gasket is formed with a recess for allowing the lead wire of the pressure sensor to pass therethrough.

19. The device as set forth in claim 18, wherein said retaining ring has a body of an L-like cross section and including a part-cylindrical side wall fittingly engaged with the circumferential wall of the spark plug attaching hole and an outer end wall at an outer end of said side wall, said outer end wall being held apart from an outer side surface of said gasket.

20. The device as set forth in claim 19, wherein said spark plug attaching hole has a threaded first hole section for engagement with a threaded section of a spark plug, and a second hole section for receiving a part of the spark plug projecting outward from the first hole section of the spark plug attaching hole, the spark plug attaching hole having between the first and second hole sections a shoulder on which the pressure sensor is placed, the second hole section of the spark plug attaching hole being stepped to have inner and outer portions such that said side wall of said stopper ring is fittingly engaged with the outer portion of the second hole section to hold said pressure sensor in the inner portion of the second hole section and the gasket in the outer portion of the second hole section.

21. The device as set forth in claim 20, wherein said outer end wall of said retaining ring is of such an outer diameter that is larger than that of a seat portion of the spark plug and smaller than that of said gasket.

22. A device for temporarily holding a pressure sensor in place within a spark plug attaching hole of a cylinder head prior to installation of a spark plug, the spark plug attaching hole being radially recessed to form an axial groove for receiving therein a lead wire of the pressure sensor, the device comprising:
- a gasket in the form of a flat ring, placed on the pressure sensor installed in place within the spark plug attaching hole and having a finger engaged with the groove for preventing rotation of said gasket relative to the spark plug attaching hole;
- a first resiliently deformable retaining ring resiliently deformed to attach itself to a circumferential wall of the spark plug attaching hole at a position above said gasket such that movement of said pressure sensor and said gasket within the spark plug attaching hole is restrained by said retaining ring; and
- a second resiliently deformable retaining ring resiliently deformed to attach itself to the circumferential wall of the spark plug attaching hole at a position adjacent to an outer end of the spark plug attaching hole for partly closing the groove and thereby holding the lead wire within the groove.

23. A pressure sensor arrangement comprising:
a cylinder head having a spark plug attaching hole;
said spark plug attaching hole having an annular bottom for supporting thereon a seat portion of a spark plug;
a ring-shaped pressure sensor placed on said bottom; and
a resiliently deformable retaining ring resiliently deformed into a stressed position to attach itself to a circumferential wall of said spark plug attaching hole for temporarily holding said pressure sensor within said spark plug attaching hole prior to installation of the spark plug.

24. The arrangement as set forth in claim 23, wherein said spark plug attaching hole is radially recessed to form a groove for receiving therewithin a lead wire of the pressure sensor.

25. The arrangement as set forth in claim 24, further comprising a gasket interposed between said pressure sensor and said retaining ring, said gasket having a finger engaged with said groove for thereby preventing rotation of said gasket relative to said spark plug attaching hole.

26. The arrangement as set forth in claim 24, wherein said retaining ring comprises a gasket having a plurality of resiliently deformable projections engaged with said circumferential wall of said spark plug attaching hole and a finger engaged with said groove for thereby preventing rotation of said gasket relative to said spark plug attaching hole.

27. The arrangement as set forth in claim 23, wherein said retaining ring is removable from said pressure sensor attaching hole after installation of the spark plug.

28. The arrangement as set forth in claim 23, wherein said spark plug attaching hole is radially recessed to form first and second axial grooves, said first axial groove receiving therein a lead wire of said pressure sensor.

29. The arrangement as set forth in claim 28, wherein said retaining ring comprises a gasket having a plurality of resiliently deformable projections engaged with said circumferential wall of said spark plug attaching hole and a finger engaged with said second groove for thereby preventing rotation of said gasket relative to said spark plug attaching hole.

30. A pressure sensor arrangement comprising:
a cylinder head having a spark plug attaching hole;
said spark plug attaching hole having an annular bottom for supporting thereon a seat portion of a spark plug;
a ring-shaped pressure sensor placed on said bottom;
a gasket installed in said pressure sensor attaching hole and placed on said pressure sensor;
said gasket having resilient means resiliently deformed to attach itself to a circumferential wall of said spark plug attaching hole;
said spark plug attaching hole being radially recessed to form first and second axial grooves;
said gasket having a finger received in said first groove of said spark plug attaching hole so as to be prevented from rotation relative to said spark plug attaching hole;
said pressure sensor having a lead wire received in said second groove; and
a part-circular elastic member elastically deformed to attach itself to a circumferential wall of said spark plug attaching hole at a position adjacent to an outer end of said spark plug attaching hole for partly closing said second groove and thereby holding said lead wire within said second groove.

31. The arrangement as set forth in claim 30, wherein said elastic member defines between split ends thereof a space which is aligned with said first groove.

32. A pressure sensor arrangement comprising:
a cylinder head having a spark plug attaching hole;
said spark plug attaching hole having an annular bottom for supporting thereon a seat portion of a spark plug;
a ring-shaped pressure sensor placed on said bottom;
a gasket installed in said pressure sensor attaching hole and placed on said pressure sensor;
said gasket having resilient means resiliently deformed to attach itself to a circumferential wall of said spark plug attaching hole;
said spark plug attaching hole being radially recessed to form first and second axial grooves;
said gasket having a finger received in said first groove of said spark plug attaching hole so as to be prevented from rotation relative to said spark plug attaching hole; and
a part-circular elastic member placed around said lead wire and elastically deformed to fit in said second groove to be held stationarily therein for thereby holding said lead wire within said first groove.

* * * * *